(12) United States Patent
Li et al.

(10) Patent No.: US 12,457,511 B2
(45) Date of Patent: Oct. 28, 2025

(54) NCSG FOR DEACTIVATED SERVING CELL MEASUREMENT

(71) Applicant: APPLE INC., Cupertino, CA (US)

(72) Inventors: Qiming Li, Beijing (CN); Dawei Zhang, Saratoga, CA (US); Huaning Niu, San Jose, CA (US); Jie Cui, San Jose, CA (US); Manasa Raghavan, Sunnyvale, CA (US); Xiang Chen, Campbell, CA (US); Yang Tang, San Jose, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/904,336

(22) PCT Filed: Sep. 24, 2021

(86) PCT No.: PCT/CN2021/120091
§ 371 (c)(1),
(2) Date: Aug. 16, 2022

(87) PCT Pub. No.: WO2023/044698
PCT Pub. Date: Mar. 30, 2023

(65) Prior Publication Data
US 2024/0196246 A1 Jun. 13, 2024

(51) Int. Cl.
*H04W 24/08* (2009.01)
(52) U.S. Cl.
CPC .................................. *H04W 24/08* (2013.01)
(58) Field of Classification Search
CPC ............................. H04W 24/10; H04W 24/08

USPC ........................................................ 370/252
See application file for complete search history.

(56) References Cited

U.S. PATENT DOCUMENTS

| 2021/0409988 A1 | 12/2021 | Harada et al. |
| 2021/0410024 A1* | 12/2021 | Tang ................ H04W 36/0088 |
| 2023/0088279 A1* | 3/2023 | Li ..................... H04W 72/1273 370/329 |

FOREIGN PATENT DOCUMENTS

| CN | 110870340 A | 3/2020 |
| JP | 2017538354 A | 12/2017 |
| WO | 2018089917 A1 | 5/2018 |
| WO | 2018144584 A1 | 8/2018 |
| WO | 2018144927 A1 | 8/2018 |
| WO | 2018202950 A1 | 11/2018 |
| WO | 2018211607 A1 | 11/2018 |

(Continued)

OTHER PUBLICATIONS

"Yiu et al., Per UE Network Controlled Small Gap (NCSG) Signalling, Nov. 22, 2018, WO 2018213396" (Year: 2018).*

(Continued)

*Primary Examiner* — Kevin C. Harper
(74) *Attorney, Agent, or Firm* — Dorsey & Whitney LLP

(57) ABSTRACT

Apparatuses, systems, and methods for NCSG-based measurement on deactivated serving cells. In a wireless communication system, a wireless device can acquire a measurement gap (MG) configuration scheduling measurement operation for at least one deactivated serving cell based on network-controlled small gap (NCSG), and perform the measurement operation based on the network-controlled small gap (NCSG) in accordance with the measurement gap configuration.

12 Claims, 6 Drawing Sheets

(56) References Cited

FOREIGN PATENT DOCUMENTS

WO      2019095329 A1     5/2019

OTHER PUBLICATIONS

"Zhang et al., Measurement Period Determination Method, Terminal Device, and Network Device, Feb. 9, 2023, WO 2023010260" (Year: 2021).*
Intel Corporation "Discussion on NCSG in NR", R4-2113152, 3GPP TSG-RAN WG4 Meeting # 100-e, Electronic Meeting, Agenda Item 9.11.2.3, Aug. 16-27, 2021, 10 pages.
Intel Corporation , "Discussion on NCSG in NR", R4-2106448, 3GPP TSG-RAN WG4 Meeting # 98-bis-e, Electronic Meeting, Agenda Item 8.5.2.3, May 26, 2022, 9 pages.
PCT/CN2021/120091 , International Search Report and Written Opinion, May 26, 2022, 9 pages.
NTT Docomo, Inc., "Small GAP measurement in Rel-12", R4-145958, 3GPP TSG-RAN WG4 #72bis, Republic of Singapore, Singapore, Agenda Item 7.37.4, Oct. 6-10, 2014, 8 pages.

* cited by examiner

NCSG FOR DEACTIVATED SERVING CELL MEASUREMENT

FIELD

This application relates generally to wireless communication systems, including deactivated serving cell measurement in the wireless communication systems.

DESCRIPTION OF THE RELATED ART

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments. NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

SUMMARY

Embodiments relate to improved deactivated serving cell measurement in the wireless communication systems, and particularly relate to Network-controlled small gap (NCSG)-based measurement for deactivated serving cells in the wireless communication systems.

According to the techniques described herein, a wireless device in a wireless communication system can acquire a measurement gap (MG) configuration scheduling measurement operation for at least one deactivated serving cell based on network-controlled small gap (NCSG), and perform the measurement operation based on the network-controlled small gap (NCSG) in accordance with the measurement gap configuration.

In one aspect, the measurement gap (MG) configuration may include information indicating a measurement periodicity of NCSG-based measurement for a deactivated serving cell. In particular, the measurement periodicity of NCSG-based measurement may mean the periodicity that the wireless device switches on and off a frequency segment corresponding to the deactivated serving cell via gaps for the measurement of the deactivated serving cell, so that the wireless device can perform the measurement operation for the deactivated serving cell in accordance with the measurement periodicity.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

To easily identify the discussion of any particular element or act, the most significant digit or digits in a reference number refer to the figure number in which that element is first introduced.

Figure 1:
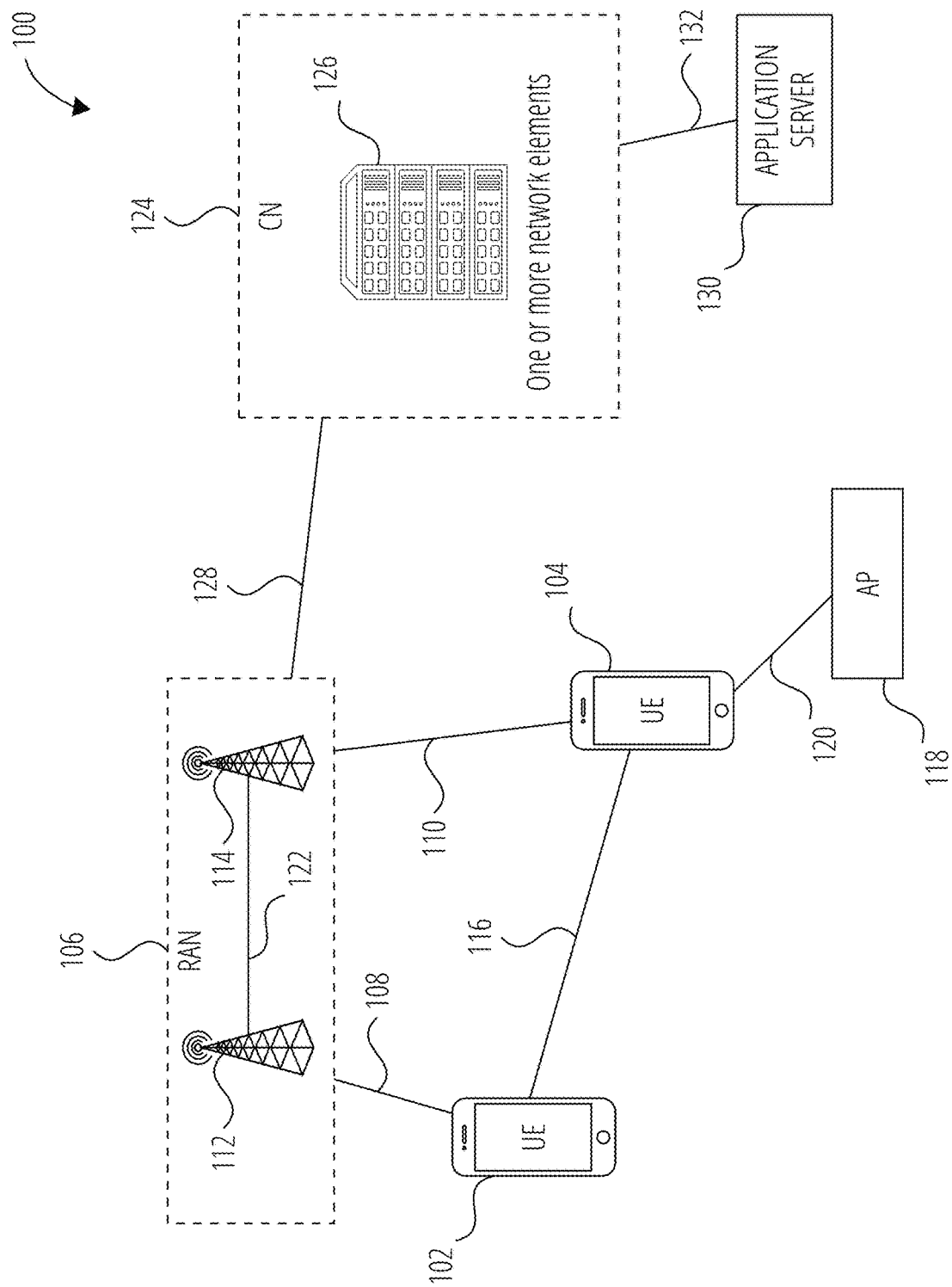
FIG. 1 illustrates an example architecture of a wireless communication system, according to embodiments disclosed herein.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Network Device—any of various types of computer systems or devices that perform communications, particularly perform wireless communication with the wireless device, such as downlink communication to the wireless device related to downlink transmission. The network device can be portable (or mobile) or may be stationary or fixed at a certain location. A base station is an example of a network device.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touchscreen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fic router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
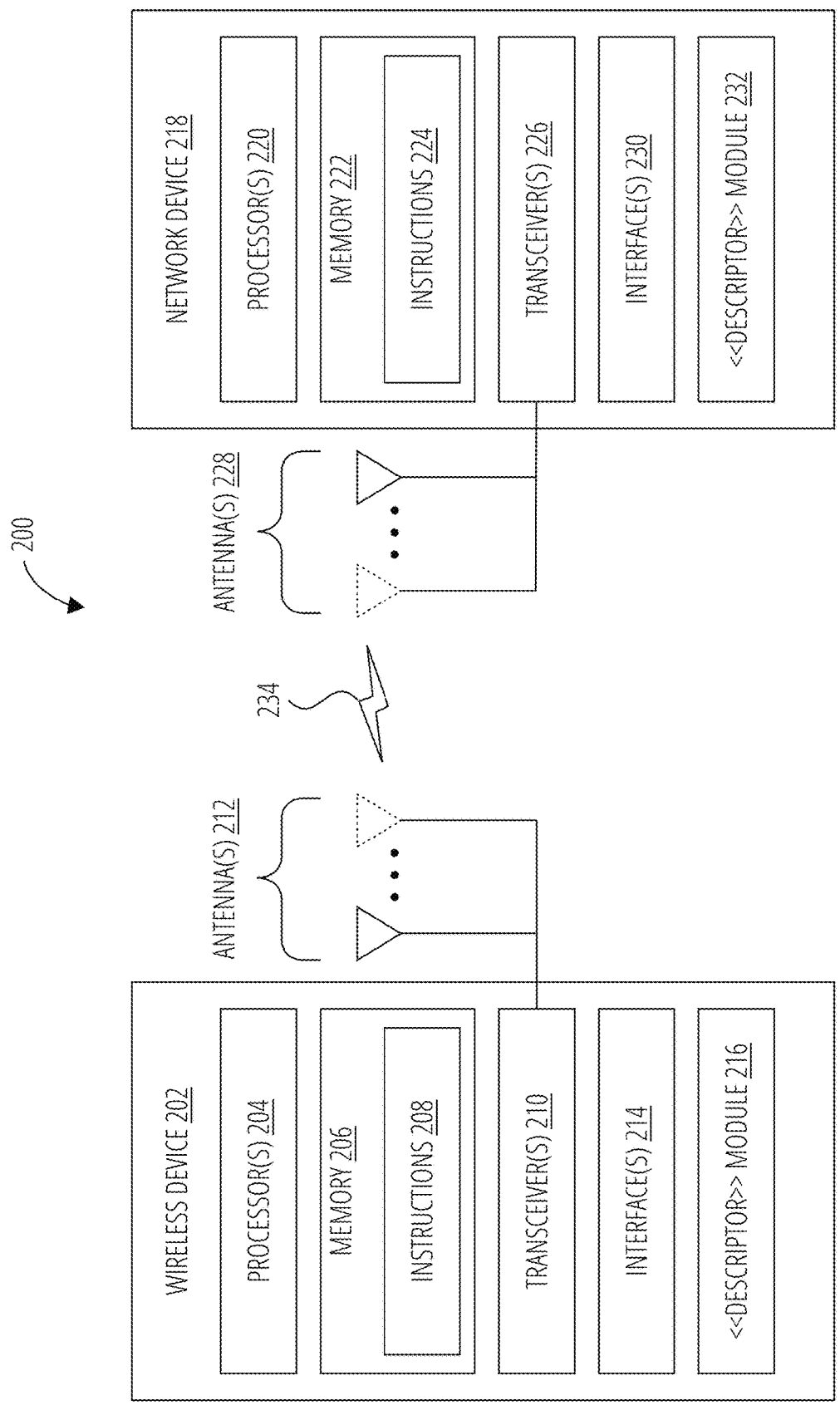
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The wireless device 202 may be used for various aspects of the present disclosure, particularly acquisition of measurement gap configuration for measurement on deactivated serving cells and/or performing the measurement on deactivated serving cells based on NCSG. Such operation/functionality can be implemented via hardware, software, or combinations thereof. For example, such operation/functionality can be performed by means of a specific component incorporated in the wireless device, for example, a processor, circuit, which can be integrated within the processor(s) 204 and/or the transceiver(s) 210, and/or can be performed by means of software, such as instructions 208 stored in the memory 206 and executed by the processor(s) 204. In particular, such functionality can be implemented by a combination of software components (e.g., executed by a DSP or a general processor) and hardware components (e.g., logic gates and circuitry) within the processor(s) 204 or the transceiver(s) 210. Some embodiments of such operation/functionality will be described below in detail with reference to figures.

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/ antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

The network device 218 may be used for various aspects of the present disclosure, particularly acquisition of measurement gap configuration for measurement on deactivated serving cells based on NCSG and/or performing data scheduling in accordance with the measurement gap configuration. Such operation/functionality can be implemented via hardware, software, or combinations thereof. For example, such operation/functionality can be performed by means a specific component incorporated in the wireless device, for example, a processor, circuit, which can be integrated within the processor(s) 220 and/or the transceiver(s) 226, and/or can be performed by means of software, such as instructions 224 stored in the memory 222 and executed by the processor(s) 220. In particular, such functionality can be implemented by a combination of software components (e.g., executed by a DSP or a general processor) and hardware components (e.g., logic gates and circuitry) within the processor(s) 220 or the transceiver(s) 226. Some embodiments of such operation/functionality will be described below in detail with reference to figures.

Hereinafter the techniques related to NCGS-based measurement on deactivated cells according to embodiments of the present disclosure will be described.

New cellular communication techniques are continually under development, to increase coverage, to better serve the range of demands and use cases, and for a variety of other reasons. One technique that is currently under development may include enhancement of measurement operation by means of measurement gap. As part of such development, it would be useful to provide improved measurement gap configuration and operation.

In wireless communication, when it is required to perform measurement operation for a specific signal/parameter/indicator which may be for example, performance related, particularly a case that such measurement operation shall be performed at a different frequency point, to deal with possible inter-frequency measurement, Measurement Gap is utilized. The idea of Measurement Gap is to create a small gap, during which neither transmission nor reception occurs, thus, the wireless device can perform the corresponding measurement operation in the Measurement Gap and then switch back. Currently, the measurement operation can be performed based on measurement gap information, and for further enhancing measurement operation, it is desired to provide an improved measurement gap configuration.

According to the new release 17 work item of measurement gap enhancement, RAN4 is to introduce some improved gap-based measurement. One of the objectives is to introduce Network Controlled Small Gap (NCSG) to avoid throughput degradation by using legacy gap.

Figure 3A:
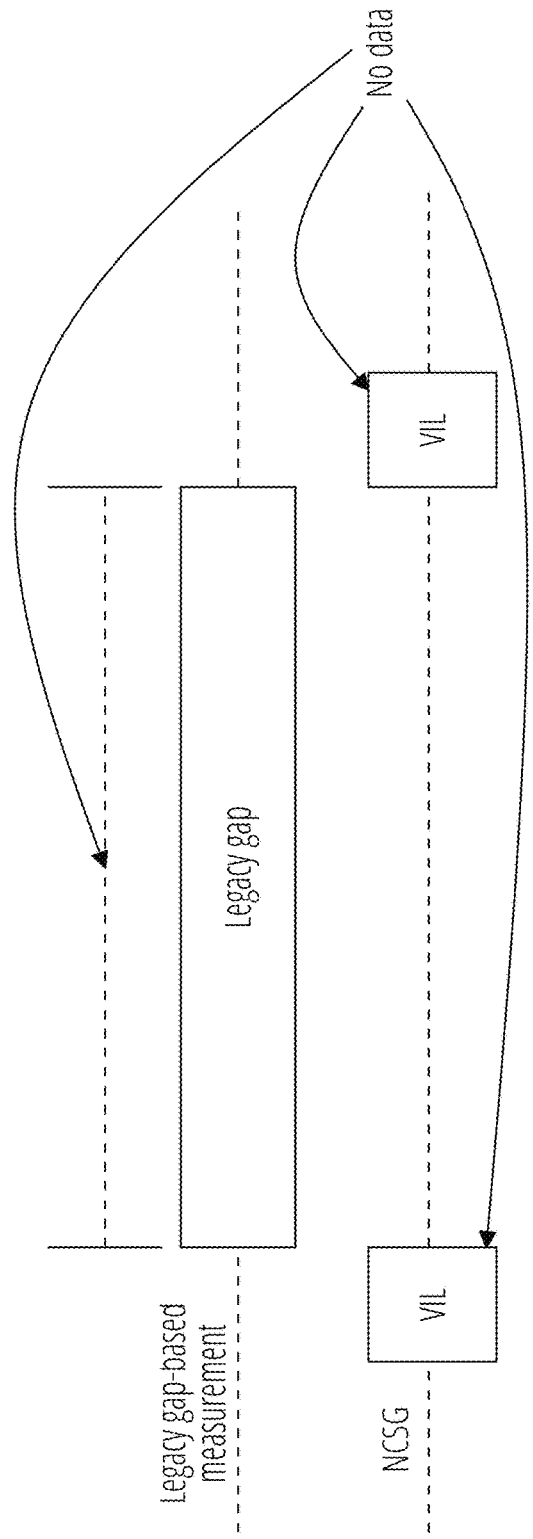
FIG. 3A illustrates comparison between legacy gap-based measurement and NCSG-based measurement.
Figure 3B:
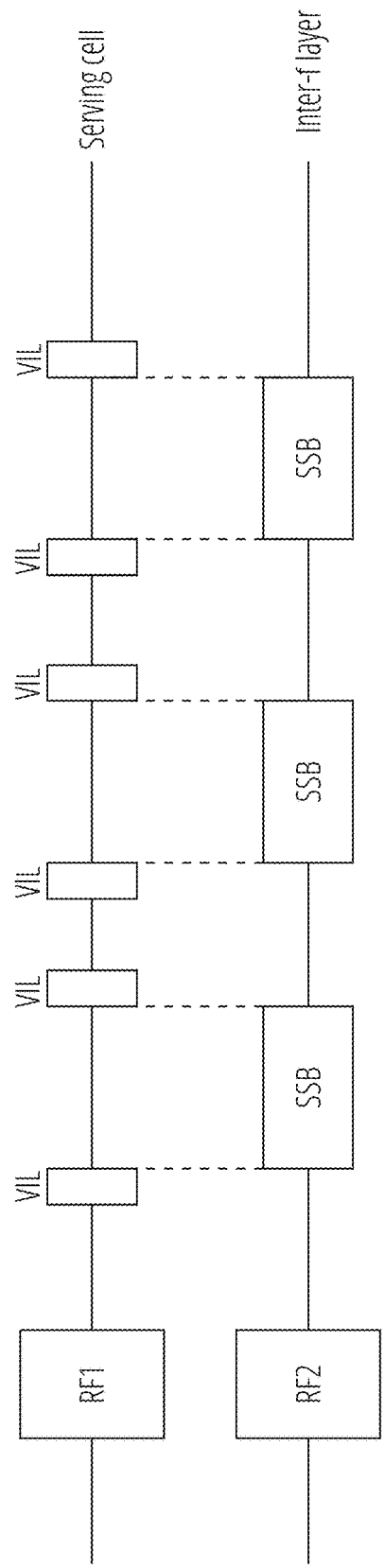
FIG. 3B illustrates basic idea of NCSG.

In legacy gap-based RRM measurement, the whole gap occasion can be utilized for measurement, but UE cannot perform data reception and transmission with serving cell during the whole gap occasion, while in NCSG based RRM measurement, UE is only allowed to cause interruption, particularly, Visible Interruption Length (VIL), at the beginning and the end of the measurement. The interruption comes from the fact that UE needs to switching on and off the spare RF chain for the measurement. During the Measurement Length (ML) which may be between the beginning and end VILs, UE shall be able to simultaneously perform RRM measurement and data reception/transmission with serving cell. The comparison between the legacy-gap and NCSG is as shown in FIG. 3A. The basic idea of NCSG is that UE can use a spare RF chain to conduct measurement on other inter-frequency layers. For example, as shown in FIG. 3B, the NCSG can switch on and off an inter-frequency layer via VIL, and during the ML between the beginning and end VILs, such as SSB, the measurement on the inter-frequency layer can be performed.

Currently it is also desirable to perform measurement on a de-activated cell in a wireless communication system, particularly de-activated secondary cell (SCell). In the wireless communication system, a secondary cell can serve as an aid to a primary cell (PCell) so as to support the wireless communication, and when the secondary cell does not work, it can be deactivated so as to save energy. However, it is also necessary to measure the dc-activated SCell so as to facilitate quick activation of the d-activated SCell when the dc-activated SCell needs to be activated for wireless communication, as well as selection of an appropriate SCell from a number of de-activated SCells for subsequent application upon activation. The measurement objects/factors/contents of the de-activated SCell can be that in the measurement of an activated SCell, such as power, signal quality, etc. And the measurement of de-activated SCells can be performed periodically.

In an existing method of deactivated SCell measurement, a parameter measCycleScell is utilized. The parameter measCycleSCell is defend in TS38.331, and is used only when an SCell is configured on the frequency indicated by the measObjectNR and is in deactivated state, see TS 38.133. A gNB configures the parameter whenever an SCell is configured on the frequency indicated by the measObjectNR, but the field may also be signaled when an SCell is not configured.

The parameter measCycleScell can be set as any appropriate value, and for example, its available values can be any one as follows:

ENUMERATED {sf160, sf256, sf320, sf512, sf640, sf1024, sf1280}

Where, Value sf160 corresponds to 160 sub-frames, value sf256 corresponds to 256 sub-frames and so on. Of course, the parameter measCycleScell can be represented by other types of values, such as the period duration in unit of time, etc.

In the existing method of deactivated SCell measurement utilizing the parameters measCycleScell, if measCycleSCell is less than 640 ms, then UE shall not switch off the RF chain, that is, no interruption cannot be created, but unnecessary power consumption would be caused. And if measCycleSCell is no less than 640 ms, then UE can switch off the RF chain for power saving when there is no measurement. UE shall switch on the RF chain immediately before the measurement windows, then perform measurement during the window, then switch off the RF chain after measurement.

Moreover, corresponding RAN4 requirements can be found in TS38.133 clause 8, where item 8.2.2.2.3 specifies interruptions during measurements on deactivated SCC, in which interruptions on PCell or activated SCell(s) due to measurements when an SCell is deactivated are allowed with up to 0.5% probability of missed ACK/NACK when the configured measCycleSCell is 640 ms or longer. If the PCell or activated SCell(s) is not in the same band as the deactivated SCell, the UE is only allowed to cause interruptions on PCell or activated SCell(s) immediately before and immediately after an SMTC. Each interruption shall not exceed requirement in Table 8.2.2.2.2-1, which is not shown herein. If the PCell or activated SCell(s) is in the same band as the deactivated SCell, the UE is only allowed to cause an interruption on PCell or activated SCell(s) no earlier than X slots before TSMTC_duration and no later than X slots after TSMTC_duration, provided the cell specific reference signals from the active serving cells and the deactivated SCell are available in the same slot, where X and TSMTC_duration are given by Table 8.2.2.2.3-1 as follows. The interruption shall not exceed requirements in Table 8.2.2.2.3-1.

TABLE 8.2.2.2.3-1

Interruption duration for measurement on deactivated SCell for intra-band CA

| $\mu$ | NR Slot length (ms) | X (slots) | Interruption length (slots) |
|---|---|---|---|
| 0 | 1 | 1 | $2 + T_{SMTC\_duration} * N_{slot}^{subframe,\mu}$ |
| 1 | 0.5 | 1 | $2 + T_{SMTC\_duration} * N_{slot}^{subframe,\mu}$ |
| 2 | 0.25 | 2 | $4 + T_{SMTC\_duration} * N_{slot}^{subframe,\mu}$ |
| 3 | 0.125 | 4 | $8 + T_{SMTC\_duration} * N_{slot}^{subframe,\mu}$ |

NOTE 1:
$T_{SMTC\_duration}$ measured in subframe is the longest SMTC duration among all above active serving cells and the deactivated SCell to be measured;
NOTE 2:
$N_{slot}^{subframe,\mu}$ is as defined in TS 38.211. [6]

Therefore, it is still desirable to provide improved measurement on the de-activated serving cell.

In view of this, the present disclosure proposes an improved measurement gap (MG) configuration for measurement on the de-activated serving cell. In particular, a novel design of utilizing Network Controlled Small Gap (NCSG) for measurement of deactivated serving cells is proposed, particularly, an improved measurement gap configuration based on the NCSG can be acquired/determined, so that the measurement operation on the deactivated serving cells can be more appropriately and efficiently performed by means of NCSG. The solution of the present disclosure can be applied to any appropriate deactivated serving cell including at least one of deactivated SCell and deactivated PSCell, and measurement enhancement can be achieved and can also be introduced into RAN4.

According to some embodiments, the measurement gap configuration may include information about a Network Controlled Small Gap (NCSG) pattern/specification for the measurement operation. In particular, the Network Controlled Small Gap (NCSG) may relate to RF adjustment, and may indicate interruptions caused when the wireless device tries to expand to or switch to a frequency chain/point to perform intra-frequency measurement for a measurement target, such as a de-activated serving cell, any other measurement target, while withstanding the interruption caused by the expansion or switching.

According to the present disclosure, the measurement operation can be performed during any appropriate kinds of wireless communication operation, including such as cell switch and/or access, Carrier Aggregation including at least carrier switching and management, load aggregation, etc., at any appropriate phase/stage during the wireless communication, including such as initialization, status transition, etc., and can be utilized to measure any desired signal/parameter/indicator which may be for example, performance related, including such as SSB, PRS, etc.

According to the present disclosure, the measurement operation can be performed at any appropriate frequency segment available for measurement on deactivated serving cells based on corresponding measurement gap configuration/pattern. So that when to switch/change to a frequency segment, the measurement operation can be performed, such as based on measurement gap configuration of NCSG.

According to the present disclosure, the frequency segment may be set in accordance with the working frequency level of the wireless device. According to some embodiments, the working frequency for a wireless device can be classified into any number of appropriate levels, and accordingly, the wireless device can perform the measurement operation at any appropriate level. That is, the wireless device can perform the measurement gap operation in a frequency segment in the level, wherein the frequency segment is divided from the working frequency in the level. According to some embodiment of the present disclosure, the level can be selected from a group including UE level, frequency range level, band combination level, band level, Component Carrier (CC) level, Bandwidth Part (BWP) level, and the frequency segment for measurement gap operation can be that corresponding to the whole UE, to a frequency range, to a band combination, to a band, to a component carrier, to a BWP. Therefore, the measurement gap operation can be configured for/performed at the selected level with respect to the corresponding frequency segment. According to some embodiments, the measurement patterns can be configured for one level of working frequency segment. According to some embodiments, the measurement patterns can be configured for two or more level of working frequency segment concurrently. For example, for different level of working frequency segment, the same or different patterns can be configured.

Figure 4:
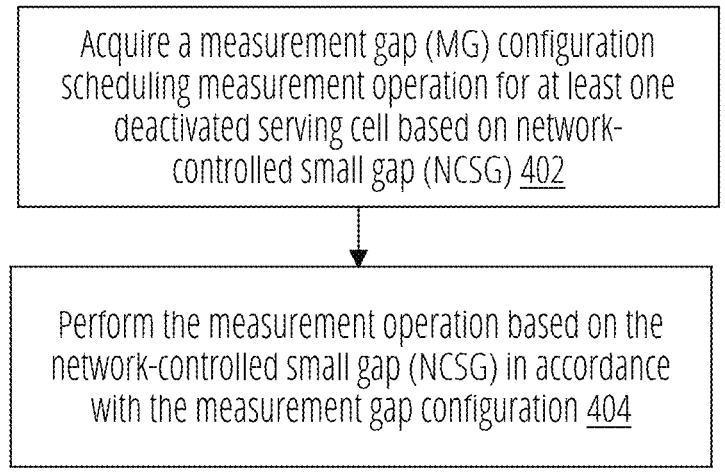
FIG. 4 is a flowchart diagram illustrating an example method at the wireless device side according to some embodiments.

FIG. 4 illustrates a signal flow diagram illustrating an example of such a solution at the wireless device side at least according to some embodiments. Aspects of the method of FIG. 4 may be implemented by a wireless device such as a UE 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. In various embodiments, some of the elements of the methods shown may be performed concurrently, in a different order than shown, may be substituted for by other method elements, or may be omitted. Additional elements may also be performed as desired.

At step 402, the wireless device acquires a measurement gap (MG) configuration scheduling measurement operation on a deactivated serving cell based on network-controlled small gap (NCSG).

At step S404, the wireless device performs the measurement operation by utilizing network-controlled small gap (NCSG) based on the measurement gap configuration.

According to some embodiments, the acquisition of measurement gap (MG) configuration can be implemented in a variety of manners. For example, the measurement gap configuration can be generated/created by the wireless device per se, and in other examples, the measurement gap configuration can be generated/created by other devices in the communication system, such as the network device, control device, etc., and communicated to the wireless device.

According to some embodiments, the measurement gap configuration can include information indicating characteristic of the NCSG for measurement on the deactivated serving cells. In some embodiments, the measurement gap (MG) configuration includes information indicating a measurement periodicity of NCSG-based measurement for a deactivated serving cell, so that the wireless device can perform the measurement operation for the deactivated serving cell in accordance with the measurement periodicity. In particular, the measurement periodicity may mean a periodicity that the wireless device switch to and off a spare frequency segment to conduct the measurement on the deactivated serving cell. According to some embodiments, the measurement periodicity may mean the period of the small gap/interruption repetition, particularly the period of the beginning or end small gap/interruption repetition during the measurement of dc-activated serving cells based on NCSG. In some embodiments, the interruptions corresponding to the measurement periodicity of NCSG can be allowed, that is, the interruptions at the measurement time instant can be allowed, so that the wireless device can switch to the frequency segment for measurement of a deactivated serving cell, while any other interruption is not allowed. For example, even an interruption, which may be allowed according to the base periodicity of NCSG, cannot be allowed if such interruption does not correspond to the adjusted/updated measurement periodicity.

In some embodiments of the present disclosure, the measurement gap configuration can further include at least one of measurement time duration, the deactivated serving cell to be measured, the frequency segment in which the measurement for the deactivated cell is to be performed. In particular, such contents may be pre-configured in advance, and will not be described in detail herein.

According to some embodiments of the present disclosure, the measurement periodicity can be determined based on a base periodicity of NCSG and a predefined measurement cycle for the at least one deactivated serving cell. In some embodiments, such measurement periodicity can be determined by any appropriate device in the wireless communication system, such as the network device, other control device in the system, and notified to the wireless device. In some embodiments, the wireless device can be configured to acquire information about a base periodicity of NCSG and a predefined measurement cycle for the at least one deactivated serving cell, and determine the measurement periodicity based thereon.

In some embodiments, the base periodicity of NCSG can be a preset value for NCSG, such as preset upon initialization, configured by the network side, such as gNB, and can be any appropriate value, for example, any one in (20 ms, 40 ms, 80 ms, 100 ms, 160 ms). For example, the base periodicity of NCSG can correspond to Visible Interruption Repetition Periodicity (VIRP) which may be introduced in 3GPP to represent the periodicity of NCSG. In the context of the present disclosure, the base periodicity of NCSG may mean an initial periodicity of NCSG and the measurement periodicity can be equivalent to a periodicity obtained by adjusting/updating the initial periodicity. In some embodiments, the predefined measurement cycle may mean a measurement cycle for the measurement on the deactivated serving cell. For example, the predefined measurement cycle may mean a desired measurement cycle or an available measurement cycle. For example, the predefined measurement cycle can correspond to measCycleSCell as mentioned above, and can be selected from the set of available measCycleSCell values.

According to some embodiments of the present disclosure, the measurement periodicity can be determined based on the largest integral multiple of the base periodicity smaller than or equal to a minimum value among the predefined measurement cycle for the at least one deactivated cell. In particular, the measurement periodicity for the measurement on the deactivated serving cells based on NCSG shall be not larger than the predefined measurement cycle which essentially define an upper limit for the measurement periodicity. On the other hand, to try to deal with measurement on respective deactivated cells appropriately, the measurement periodicity shall be as large as possible, particularly the largest possible integral multiple of the base periodicity of NCSG under the limitation of the predefined measurement cycle.

According to embodiments of the present disclosure, the measurement periodicity can be based on the relationship between the base periodicity and the predefined measurement cycle. In particular, the relationship may relate to the multiple relationship between the base periodicity and the predefined measurement cycle, that is, whether the predefined measurement cycle is an integral multiple of the base periodicity.

According to some embodiments of the present disclosure, when the predefined measurement cycle is an integral multiple of the base periodicity, the measurement periodicity can be determined based on a minimum value among the predefined measurement cycle for the at least one deactivated cell.

In some embodiments, when the predefined measurement cycles defined for a number of deactivated serving cells are the same, the measurement periodicity is based on the predefined measurement cycle per se. For example, when the NCSG is only configured from measurement on deactivated serving cells, the measurement periodicity is equal to the predefined measurement cycle per se. In such a case, since all predefined measurement cycles defined for a number of deactivated serving cells are the same, the minimum among such predefined measurement cycles may the same predefined measurement cycle per se, and thus the measurement periodicity is the predefined measurement cycle per se. In some embodiments, when the predefined measurement cycles defined for a number of deactivated serving cells are different, the measurement periodicity is based on a minimal value among the predefined measurement cycles. For example, when the NCSG is only configured from measurement on deactivated serving cells, the measurement periodicity is equal to the minimum value.

According to some embodiments of the present disclosure, the predefined measurement cycle is not an integral multiple of the base measurement periodicity, the measurement periodicity is based on the largest multiple of the base periodicity smaller than a minimum value among the predefined measurement cycle for the at least one deactivated cell. For example, when the NCSG is only configured from measurement on deactivated serving cells, the measurement periodicity is equal to the largest multiple of the base periodicity smaller than a minimum value among the predefined measurement cycle for the at least one deactivated cell.

In some embodiments, the measurement periodicity can be selected from a set of measurement cycles including the predefined measurement cycle. That is, in addition that the measurement periodicity is the largest multiple of the base periodicity of NCSG, the measurement periodicity shall be the largest one of the ones in the set smaller than the predefined measurement cycle.

According to some embodiments of the present disclosure, the measurement periodicity is further based on the configuration of NCSG, such as measurement mode configuration of NCSG. For example, the measurement mode configuration of NCSG may indicate which kinds of measurement are to be performed based on NCSG. For example, in addition to the measurement on deactivated serving cells, the NCSG can also be utilized for other type of measurement related to other target on other frequency segment.

In some embodiments, the measurement periodicity can be further multiplied by a weight factor which relates to other type NCSG-based measurements in addition to the NCSG-based measurement for the deactivated serving cell. In particular, in addition to NCSG is configured for measurement for the deactivated serving cell, the NCSG can be configured for performing other types of measurements on an inter-frequency layer on which the measurement of deactivated cell is not performed. In such a case, the measurement periodicity usually shall be expanded so as to have sufficient duration to perform both the NCSG-based measurement on deactivated cells and the NCSG-based inter-frequency measurement.

In some embodiments, the weight factor is determined based on the number of deactivated serving cells to be measured and the number of frequency segments on which any other type measurement is to be performed. In some embodiments, the weight factor is a value equal to a sum of the number of deactivated serving cells to be measured and the number of frequency segments on which other type measurements are to be performed.

In some embodiments, in operation, the wireless device can be further configured to receive a switching instruction indicating switching of deactivated serving cell available for measurement operation, and perform the measurement at the switched deactivated serving cell based on the measurement periodicity associated with the switched frequency segment. According to some embodiments, the switching of frequency segment corresponding to the deactivated cells can be instructed by the network device or any other appropriate device in the wireless system. According to some embodiments, such switching instruction can be communicated between the network device and the wireless device in any manner, such as via any of RRC layer, MAC layer, physical layer.

According to some embodiments of the present disclosure, the NCSG-based measurement on deactivated cells of the present disclosure also depends on the support/allowance for NCSG-based measurement on deactivated cells of the present disclosure. In some embodiments, the wireless device can be further configured to acquire a support information indicating whether the NCSG-based measurement on deactivated cells is allowed/supported/enabled or not, and when the support information indicates the NCSG-based measurement on deactivated cells is allowed/supported/enabled, the wireless device can perform the NCSG-based measurement on deactivated cells based on the measurement gap configuration. Otherwise, the wireless device will not perform such NCSG-based measurement on deactivated cells based on the measurement gap configuration, and can perform other kinds of measurement, such as legacy-based measurement on deactivated cells, or even does not perform the measurement on deactivated cells at all.

For example, the support/allowance configuration may indicate that the NCSG-based measurement on deactivated cells may be always supported/allowed, or may be supported/allowed in a specific condition. In some embodiments, the NCSG-based measurement on deactivated cells of the present disclosure when the predefined measurement cycle is an integral multiple of the base periodicity can be always supported, and the NCSG-based measurement on deactivated cells of the present disclosure when the predefined measurement cycle is not an integral multiple of the base periodicity may be not always supported, for example, can be disabled by the wireless device or network device.

In some embodiments, when the predefined measurement cycle is not an integral multiple of the base measurement periodicity, the wireless device can automatically disable the NCSG-based measurement on deactivated cells, and additionally or alternatively, may perform any other appropriate measurement, such as measurement based on legacy gap.

According to some embodiments, the support/allowance configuration can be set at the wireless device side, such as set by default, during initialization, before a wireless communication, and such support condition can be kept constantly, or can be changed dynamically, for example periodically, or for different wireless communication. In such a case, the support information is set by the wireless device per se, and the wireless device can automatically enable/disable the NCSG-based measurement on deactivated cells, particularly the NCSG-based measurement on deactivated cells when the predefined measurement cycle is not an integral multiple of the base periodicity.

According to some embodiments, whether the support/allowance of NCSG-based measurement on deactivated cells of the present disclosure is also indicated/set by the network device or any appropriate device in the wireless communication system, and be notified to the wireless device, such as during initialization, before wireless communication to be performed, before measurement to be performed. In some embodiments, the support information can be notified to the wireless device upon request. For example, the wireless device can request the support information from the network device, and upon reception of the support information, perform corresponding operations, such as before wireless communication, upon acquisition of the measurement gap configuration, even upon acquisition of the base periodicity and the predefined measurement cycle.

In some embodiments, the support information can be initiatively communicated to the wireless device along with the configuration of the base periodicity and measurement cycle. In such a case, when support information indicates such NCSG can be utilized for measurement on deactivated serving cells, the wireless device can automatically determine the measurement periodicity depending on such support indication, and can perform NCSG-based measurement on deactivated serving cells. On the other hand, when such NCSG-based measurement on deactivated serving cells is not supported, the wireless device will not perform measurement, or perform the measurement in any other appropriate manner. Furthermore, if the network device indicates support of measurement on deactivated serving cells, without defining the wireless measurement behavior, the wireless device can perform the measurement on deactivated serving cells in any appropriate manner, as described above.

In some embodiments, when the predefined measurement cycle is not an integral multiple of the base measurement periodicity, the wireless device is configured to, based on an indication from the network device concerning the NCSG-based measurement, perform any one of:

When the information indicates the NCSG-based measurement is allowed, perform the NCSG-based measurement for the deactivated serving cell;

When the information indicates the NCSG-based measurement is not allowed, not perform the NCSG-based measurement for the deactivated serving cell; and When the information indicates the measurement for deactivated serving cell is allowed but the measurement behavior is not defined, perform the measurement for the deactivated serving cell in a specific manner.

In some embodiments, the wireless device can report its capability to the network device to indicate whether NCSG-based measurement on deactivated serving cells of the present disclosure, that is, the measurement periodicity can be adjusted/updated as an integral multiple of the base periodicity, can be supported, and the wireless device can operate depending on the feedback from the network device. In some embodiments, when the wireless device reports its support capability to the network device and receive the support confirm from the network device, that is, such measurement is allowed by the network device, the wireless device can perform the measurement operation on deactivated serving cell based on the measurement periodicity of NCSG.

According to some embodiments, the NCSG-based measurement support information and/or the measurement gap (MG) configuration can be communicated between the network device and the wireless device in a variety of manners. In an example, such communication can be performed via RRC signaling, for example, the NCSG-based measurement support information and/or the measurement gap (MG) configuration can be communicated via RRC layer.

Note that the present application can be utilized to any appropriate deactivated serving cells, including at least one of Primary cell (PCell), Primary SCG cell (PSCell), and Secondary cell (SCell). And the solution of the present application as described above can be utilized for each of Primary cell (PCell), Primary SCG cell (PSCell), and Secondary cell (SCell), or their combination.

Embodiments contemplated herein include an apparatus comprising means to perform one or more elements of the method for the wireless device as described above. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of the method for the wireless device as described above. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the method for the wireless device as described above. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of the method for the wireless device as described above. This apparatus may be, for example, an apparatus of a UE (such as a wireless device 202 that is a UE, as described herein).

Embodiments contemplated herein include a signal as described in or related to one or more elements of the method for the wireless device as described above.

Embodiments contemplated herein include a computer program or computer program product comprising instructions, wherein execution of the program by a processor is to cause the processor to carry out one or more elements of the method for the wireless device as described above. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

Figure 5:
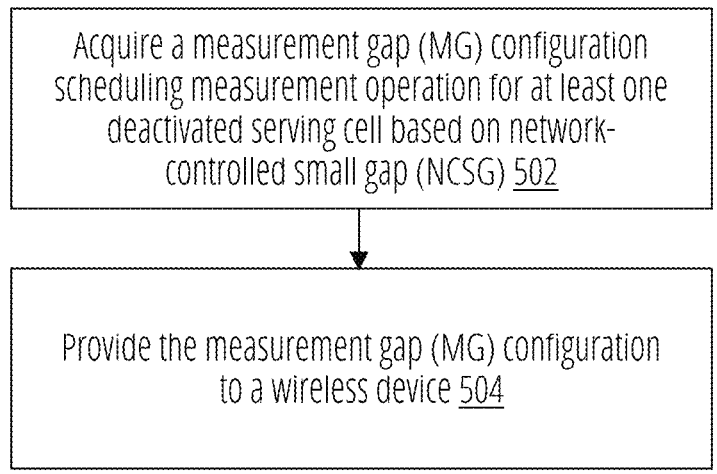
FIG. 5 is a flowchart diagram illustrating an example method at the network device side according to some embodiments.

Hereinafter the embodiments related to the network device will be described. FIG. 5 illustrates a signal flow diagrams illustrating an example of such a solution, at least according to some embodiments. Aspects of the method of FIG. 5 may be implemented by a network device such as 218 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. In various embodiments, some of the elements of the methods shown may be performed concurrently, in a different order than shown, may be substituted for by other method elements, or may be omitted. Additional elements may also be performed as desired.

At step 502, the network device acquires a measurement gap (MG) configuration scheduling measurement operation for at least one deactivated serving cell based on network-controlled small gap (NCSG).

At step 504, the network device provides a measurement gap (MG) configuration to the wireless device.

According to some embodiments, the network device can provide a support information about NCSG-based measurement on deactivated cells to the wireless device. In some embodiments, such supported information indicates whether NCSG-based measurement on deactivated cells is allowed at the wireless device. In some embodiments, such supported information indicates whether NCSG-based measurement on deactivated cells is allowed at the wireless device when the predefined measurement cycle is not integral multiple of a base periodicity of NCSG.

According to some embodiments, the support information can be provided automatically by the network device along with the MG configuration, or can be provided upon request from the wireless device. In some embodiments, the network device can receive a request from the wireless device, and provide the support information upon the request. Such request can be presented in any manner, for example, a request whether such NCSG-based measurement is supported, a capability whether such NCSG-based measurement can be supported at the wireless device, etc.

Embodiments contemplated herein include an apparatus comprising means to perform one or more elements of the network device side method as described above. This apparatus may be, for example, an apparatus of a base station (such as a network device 218 that is a base station, as described herein).

Embodiments contemplated herein include one or more non-transitory computer-readable media comprising instructions to cause an electronic device, upon execution of the instructions by one or more processors of the electronic device, to perform one or more elements of the network device side method as described above. This non-transitory computer-readable media may be, for example, a memory of a base station (such as a memory 222 of a network device 218 that is a base station, as described herein).

Embodiments contemplated herein include an apparatus comprising logic, modules, or circuitry to perform one or more elements of the network device side method as described above. This apparatus may be, for example, an apparatus of a base station (such as a network device 218 that is a base station, as described herein).

Embodiments contemplated herein include an apparatus comprising: one or more processors and one or more computer-readable media comprising instructions that, when executed by the one or more processors, cause the one or more processors to perform one or more elements of the network device side method as described above. This apparatus may be, for example, an apparatus of a base station (such as a network device 218 that is a base station, as described herein).

Embodiments contemplated herein include a signal as described in or related to one or more elements of the network side method as described above.

Embodiments contemplated herein include a computer program or computer program product comprising instructions, wherein execution of the program by a processing element is to cause the processing element to carry out one or more elements of the network device side method as described above. The processor may be a processor of a base station (such as a processor(s) 220 of a network device 218 that is a base station, as described herein). These instructions may be, for example, located in the processor and/or on a memory of the UE (such as a memory 222 of a network device 218 that is a base station, as described herein).

Figure 6:
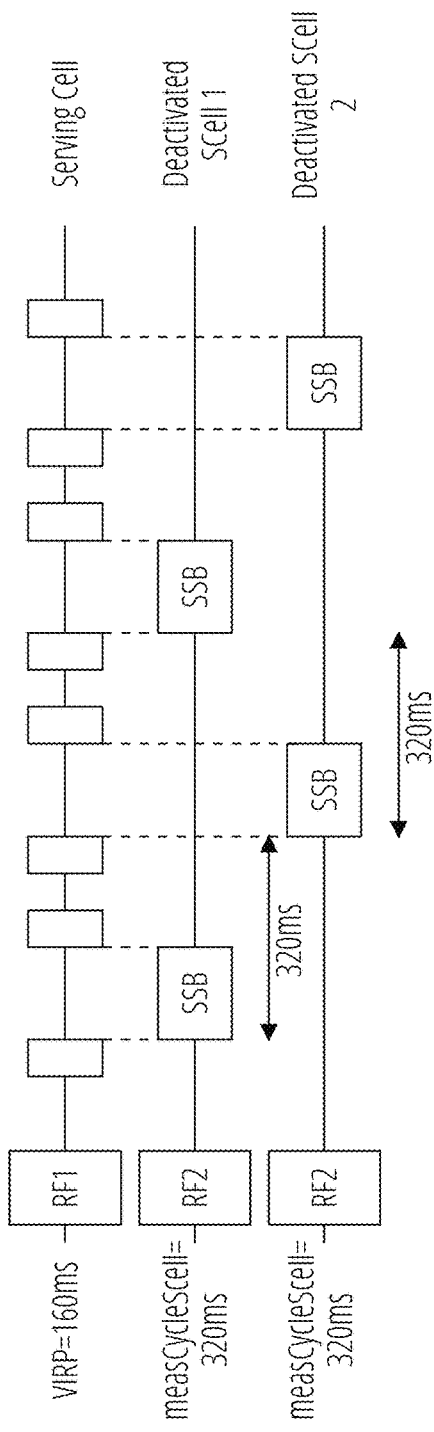
FIG. 6 illustrates an exemplary embodiment wherein a NCSG is utilized for deactivated serving cell measurement.
Figure 7:
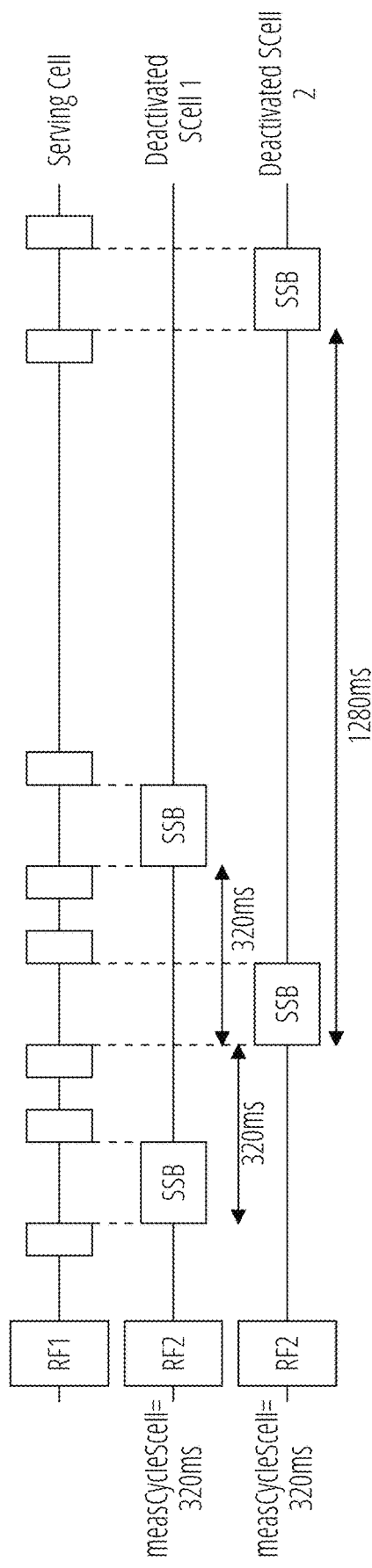
FIG. 7 illustrates an exemplary embodiment wherein a NCSG is utilized for deactivated serving cell measurement.
Figure 8:
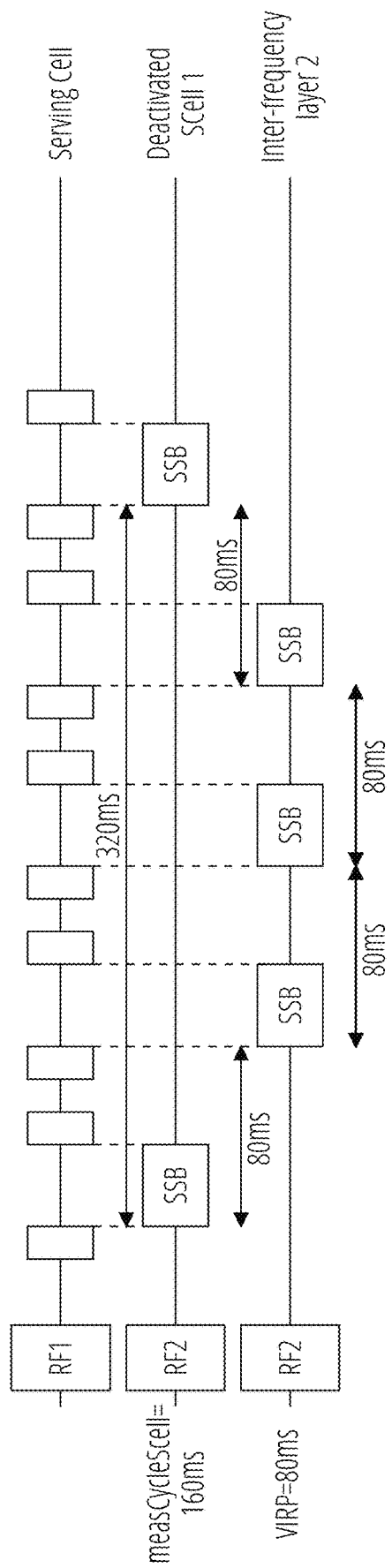
FIG. 8 illustrates an exemplary embodiment wherein a NCSG is utilized for deactivated serving cell measurement.

Hereinafter, some exemplary embodiments of NCSG-based measurement gap operation on deactivated cells will be described with reference to FIGS. 6-8. FIGS. 6-8 illustrate further aspects that might be used in conjunction with the method of FIGS. 4 and 5 if desired. It should be noted, however, that the exemplary details illustrated in and described with respect to FIGS. 6-8 are not intended to be limiting to the disclosure as a whole: numerous variations and alternatives to the details provided herein below are possible and should be considered within the scope of the disclosure.

As shown in figures, the wireless device performs the measurement gap operations on radio frequency (RF) layer, please note that such RF layer is only an example of the working frequency segment, and other level of working frequency segment, as described above, can be utilized similarly. Note that the following description is mainly directed to SCell, but such embodiments can be applied to PSCell equivalently.

Embodiment 1 illustrates a case that the predefined measurement cycle is the integral multiple of the base measurement periodicity of NCSG, while NCSG is only configured for measurement on deactivated serving cells, as shown in FIG. 6. In particular, measCycleSCell is the integral multiples of VIRP and measCycleSCell configured for all deactivated SCell is the same.

In such a case, UE will automatically adjust the periodicity of NCSG to perform measurement. In particular, UE will automatically update the periodicity of NCSG from VIRP to measCycleSCell as the measurement periodicity of NCSG. No any other interruption is allowed excepted VIL according to the 'new' VIRP. Note that most likely the longest VIRP will be 160 ms, while measCycleSCell can be much longer (160 ms to 1280 ms).

From network perspective, network will follow the 'new' periodicity for data scheduling, i.e., to determine the VIL location.

Embodiment 2 illustrates a case that the predefined measurement cycle is the integral multiple of the base measurement periodicity of NCSG, while NCSG is only configured for measurement on deactivated serving cells, as shown in FIG. 7. In particular, measCycleSCell is the integral multiples of VIRP and measCycleSCell configured for all deactivated SCells are different from each other.

In such a case, UE will automatically adjust the periodicity of NCSG to perform measurement. In particular. UE will automatically update the periodicity of NCSG from VIRP to minimum measCycleSCell among the measCycleSCell configured for all deactivated SCells, the measurement periodicity of NCSG. No any other interruption is allowed excepted VIL according to the 'new' VIRP.

For example, measCycleSCell on SCell 1 is 320 ms, while measCycleSCell on SCell 2 is 640 ms. Therefore, according to RAN4 measurement requirement, sampling interval is 640 ms on SCell 1 and 1280 ms on SCell 2, since CSSF=2. That means within 1284) UE needs to make three samples, i.e., two on SCell 1 and one on SCell2. However, 1280 cannot be integrally decided by three. Conservatively, UE still requires VIRP=320 ms.

From network perspective, network will follow the 'new' periodicity for data scheduling, i.e., to determine the VIL location.

Embodiment 3 illustrates a case that the predefined measurement cycle is the integral multiple of the base measurement periodicity of NCSG, while NCSG is configured for measurement on deactivated serving cells and other type of measurements, as shown in FIG. 8. In particular, measCycleSCell is the integral multiples of VIRP and measCycleSCell configured for all deactivated SCell is the same. NCSG is configured for both inter-f measurement and measurement on deactivated serving cells.

In such a case, UE will automatically acquire the measurement periodicity of NCSG to perform measurement on deactivated serving cells. In particular, the UE measures deactivated SCells using NCSG following CSSF*measCycleSCell, as the measurement periodicity of NCSG, wherein CSSF includes number of deactivated SCC and layers for inter-frequency measurement. On the other hand, UE keeps VIRP unchanged, and UE measures other inter-frequency layer on NCSG occasions which are not used for deactivated SCell measurement, and such measurement is performed in according to VIRP. In the operation, no any other interruption is allowed excepted VIL occurs every VIRP.

From network perspective, network will follow the measurement periodicity and VIRP for data scheduling, i.e., to determine the VIL location.

Embodiment 4 illustrates a case that the predefined measurement cycle is not an integral multiple of the base measurement periodicity of NCSG, while NCSG is only configured for measurement on deactivated serving cells. In particular, measCycleSCell is not the integral multiples of VIRP and measCycleSCell configured for all deactivated SCell is the same. For example, measCycleSCell corresponds to sf256, sf512, or sf1024 from the set of {sf160, sf256, sf320, sf512, sf640, sf1024, sf1280}, while VIRP may be any of sf20, sf40, sf60, sf80, . . . , sf160, and for example, sf160 in this embodiment.

When such case is supported by the wireless device, UE will automatically adjust the periodicity of NCSG to perform measurement. In particular, UE will automatically update the periodicity of NCSG from VIRP to a new periodicity (e.g., measCycleSCell_new) as the measurement periodicity of NCSG, which is the greatest measCycleSCell value among the ones smaller than the indicated measCycleSCell. No any other interruption is allowed excepted VIL according to the 'new' VIRP.

For example, if measCycleSCell is configured as sf512, then the new periodicity is sf320. Reason is those values are NOT the integral multiples of possible SMTC periodicity. So, it cannot be efficiently covered by measCycleSCell.

However, since the longest SMTC periodicity is 160 ms, UE can at least find one SMTC during each measCycleSCell window.

when such a case is not supported by the wireless device, UE will automatically disable NCSG for measurement on deactivated SCC. Instead, UE uses interruption based measurement as legacy.

Furthermore, whether such a case is supported also can be indicated/allowed by the network device.

When the network device does not allow such a case, UE will disable NCSG for measurement on deactivated SCC. Instead, UE uses interruption-based measurement as legacy, or does not perform measurement at all.

When the network device allows such a case without defining the UE measurement behavior, that is, does not clearly define how the UE perform the measurement, UE can perform the measurement in any appropriate manner, such as the NCSG-based measurement, interruption-based measurement as legacy, etc.

From network perspective, network will follow the measurement periodicity and VIRP for data scheduling, i.e., to determine the VIL location.

Embodiment 5 illustrates a case that the predefined measurement cycle is not an integral multiple of the base measurement periodicity of NCSG, while NCSG is configured for measurement on deactivated serving cells and other types of measurement. In particular, measCycleSCell is not the integral multiples of VIRP and measCycleSCell configured for all deactivated SCell is the same. In particular, NCSG is configured for both inter-f measurement and measurement on deactivated serving. The values of the measCycleSCell and VIRP may be that in the previous embodiment.

When the case is supported by the wireless device, UE will acquire the measurement periodicity of NCSG to perform measurement on deactivated serving cells. In particular, UE measures deactivated SCells using NCSG following CSSF*measCycleSCell_new as the measurement periodicity of NCSG, where measCycleSCell_new is the greatest measCycleSCell value among the ones smaller than the indicated measCycleSCell, wherein CSSF includes number of deactivated SCC and layers for inter-frequency measurement, and UE measures other inter-frequency layer on NCSG occasions which are not used for deactivated SCell measurement. In such a case, no any other interruption is allowed excepted VIL occurs every VIRP.

When such a case is not supported by the wireless device, UE will automatically disable NCSG for measurement on deactivated SCC. Instead, UE uses interruption based measurement as legacy. However, UE shall still use NCSG for measuring other inter-frequency layers.

Furthermore, whether such a case is supported also can be indicated/allowed by the network device.

When the network device does not allow such a case, UE will disable NCSG for measurement on deactivated SCC. Instead, UE uses interruption-based measurement as legacy, or does not perform measurement at all.

When the network device allows such a case without defining the UE measurement behavior, that is, does not clearly define how the UE perform the measurement, UE can perform the measurement in any appropriate manner, such as the NCSG-based measurement, interruption-based measurement as legacy, etc.

From network perspective, network will follow the measurement periodicity and VIRP for data scheduling, i.e., to determine the VIL location.

Embodiment 6 illustrates the solution of using NCSG for deactivated PSCell measurement. In such a case, there may be a new signaling to indicate the measurement cycle of deactivated PSCell, such as measCyclePSCell. Candidate values for measCyclePSCell can also be categorized into two sets, one of which is integral multiples of VIRP while the other one is not, similar with that for SCell, Similar approach mentioned for deactivated SCell can also apply here.

In the following further exemplary embodiments are provided.

One set of embodiments may include a wireless device, comprising: at least one antenna; at least one radio coupled to the at least one antenna; and a processor coupled to the at least one radio; wherein the wireless device is configured to acquire a measurement gap (MG) configuration scheduling measurement operation for at least one deactivated serving cell based on network-controlled small gap (NCSG), and perform the measurement operation based on the network-controlled small gap (NCSG) in accordance with the measurement gap configuration.

According to some embodiments, the measurement gap (MG) configuration includes information on a measurement periodicity of NCSG-based measurement for a deactivated serving cell, and wherein the wireless device is configured to perform the measurement operation for the deactivated serving cell in accordance with the measurement periodicity.

According to some embodiments, the information includes information about a base periodicity of NCSG and a predefined measurement cycle for measurement of a dc-activated serving cell, and the measurement periodicity is determined based on the base periodicity of NCSG and the predefined measurement cycle.

According to some embodiments, the measurement periodicity is determined based on the largest integral multiple of the base periodicity smaller than or equal to a minimum value among the predefined measurement cycle for the at least one deactivated cell.

According to some embodiments, when the predefined measurement cycle is an integral multiple of the base periodicity, the measurement periodicity is based on a minimum value among the predefined measurement cycle for the at least one deactivated cell.

According to some embodiments, when the predefined measurement cycles defined for a number of deactivated serving cells are the same, the measurement periodicity is the predefined measurement cycle per se.

According to some embodiments, when the predefined measurement cycles defined for a number of deactivated serving cells are different, the measurement periodicity is a minimal value among the predefined measurement cycles.

According to some embodiments, when the predefined measurement cycle is not an integral multiple of the base measurement periodicity, the measurement periodicity is based on the largest multiple of the base periodicity smaller than a minimum value among the predefined measurement cycle for the at least one deactivated cell.

According to some embodiments, the measurement periodicity is a value selected from a set of measurement cycles including the predefined measurement cycle and which is a largest one of the ones in the set smaller than the minimum value.

According to some embodiments, when the NCSG is utilized for measurement of deactivated serving cell and other type measurements, the measurement periodicity is further multiplied by a weight factor which relates to other type measurements.

According to some embodiments, the weight factor is a value equal to a sum of the number of deactivated serving cells to be measured and the number of frequency segments on which other type measurements are to be performed.

According to some embodiments, the deactivated serving cell includes at least one of a secondary cell, a primary cell and a primary SCG cell.

According to some embodiments, the predefined measurement cycle is not an integral multiple of the base measurement periodicity, the wireless device disables the measurement operation on the deactivated cell based on NCSG.

According to some embodiments, the predefined measurement cycle is not an integral multiple of the base measurement periodicity, the wireless device can acquire an indication from the network device concerning the NCSG-based measurement, and the wireless device is configured to any one of:
  when the information indicates the NCSG-based measurement is allowed, perform the NCSG-based measurement for the deactivated serving cell;
  when the information indicates the NCSG-based measurement is not allowed, not perform the NCSG-based measurement for the deactivated serving cell; and
  when the information indicates the measurement for deactivated serving cell is allowed, perform the measurement for the deactivated serving cell in a specific manner.

Another set of embodiments include a network device, comprising at least one antenna; at least one radio coupled to the at least one antenna; and a processor coupled to the at least one radio; wherein the network device is configured to acquire a measurement gap (MG) configuration scheduling measurement operation for at least one deactivated serving cell based on network-controlled small gap (NCSG), and provide the measurement gap (MG) configuration to a wireless device.

According to some embodiments, the network device is further configured to provide a support information about NCSG-based measurement on deactivated cells to the wireless device.

According to some embodiments, the network device is further configured to receive a request from the wireless device about whether NCSG-based measurement on deactivated cells is allowed, and provide a support information indicating whether NCSG-based measurement on deactivated cells is allowed to the wireless device.

According to some embodiments, the network device is further configured to provide the measurement gap (MG) configuration via RRC signaling.

Yet another set of embodiments may include an apparatus, comprising: a processor configured to cause a wireless device to acquire a measurement gap (MG) configuration scheduling measurement operation for at least one deactivated serving cell based on network-controlled small gap (NCSG), and perform the measurement operation based on the network-controlled small gap (NCSG) in accordance with the measurement gap configuration.

According to some embodiments, the processor can cause the wireless device to implement any or all parts of any of the preceding embodiments/examples.

Yet another set of embodiments may include an apparatus, comprising: a processor configured to cause a network device to: acquire a measurement gap (MG) configuration scheduling measurement operation for at least one deactivated serving cell based on network-controlled small gap (NCSG), and provide the measurement gap (MG) configuration to a wireless device.

According to some embodiments, the processor can cause the network device to implement any or all parts of any of the preceding embodiments/examples.

Yet another set of embodiments may include a method for a wireless device, comprising acquiring a measurement gap (MG) configuration scheduling measurement operation for at least one deactivated serving cell based on network-controlled small gap (NCSG), and performing the measurement operation based on the network-controlled small gap (NCSG) in accordance with the measurement gap configuration.

According to some embodiments, the method can be further performed by the wireless device to implement any or all parts of any of the preceding embodiments/examples.

Yet another set of embodiments may include a method for a network device, comprising acquiring a measurement gap (MG) configuration scheduling measurement operation for at least one deactivated serving cell based on network-controlled small gap (NCSG), and providing the measurement gap (MG) configuration to a wireless device.

According to some embodiments, the method can be further performed by the network device to implement any or all parts of any of the preceding embodiments/examples.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising by a device: performing any or all parts of the preceding examples.

A yet further exemplary embodiment may include a non-transitory computer accessible memory medium comprising program instructions which, when executed at a device, cause the device to implement any or all parts of any of the preceding examples.

A yet further exemplary embodiment may include a device comprising: a processor, and a computer-readable storage medium, having program instructions stored thereon, which, when executed, cause the device to implement any or all parts of any of the preceding examples.

A still further exemplary embodiment may include a computer program product comprising instructions for performing any or all parts of any of the preceding examples.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above-described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems, or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A wireless device, comprising:
at least one antenna;
at least one radio coupled to the at least one antenna; and
a processor coupled to the at least one radio;
wherein the wireless device is configured to:
  acquire a measurement gap (MG) configuration scheduling a measurement operation for at least one deactivated serving cell based on a network-controlled small gap (NCSG), and
  perform the measurement operation based on the NCSG in accordance with the MG configuration;
  wherein the MG configuration includes information on a measurement periodicity of NCSG-based measurement for a deactivated serving cell, and wherein the wireless device is configured to perform the measurement operation for the deactivated serving cell in accordance with the measurement periodicity;
  wherein the information includes information about a base periodicity of NCSG and a predefined measurement cycle for measurement of a de-activated serving cell, and the measurement periodicity is determined based on the base periodicity of NCSG and the predefined measurement cycle; and wherein the measurement periodicity is determined based on a largest integral multiple of the base periodicity smaller than or equal to a minimum value among the predefined measurement cycle for the at least one deactivated cell.

2. The wireless device of claim 1, wherein the deactivated serving cell includes at least one of a secondary cell, a primary cell and a primary SCG cell.

3. The wireless device of claim 1, wherein when the predefined measurement cycle is not an integral multiple of the base periodicity, the wireless device disables the measurement operation on the deactivated cell based on NCSG.

4. The wireless device of claim 1, wherein the predefined measurement cycle is not an integral multiple of the base periodicity, the wireless device can acquire an indication from a network device concerning the NCSG-based measurement, and the wireless device is configured to any one of:
when the information indicates the NCSG-based measurement is allowed, perform the NCSG-based measurement for the deactivated serving cell;
when the information indicates the NCSG-based measurement is not allowed, not perform the NCSG-based measurement for the deactivated serving cell; and
when the information indicates the measurement for the deactivated serving cell is allowed, perform the measurement for the deactivated serving cell in a specific manner.

5. An apparatus, comprising:
a processor configured to cause a wireless device to:
acquire a measurement gap (MG) configuration scheduling a measurement operation for at least one deactivated serving cell based on a network-controlled small gap (NCSG), and
perform the measurement operation based on the NCSG in accordance with the MG configuration;
wherein the MG configuration includes information on a measurement periodicity of NCSG-based measurement for a deactivated serving cell, and wherein the wireless device is configured to perform the measurement operation for the deactivated serving cell in accordance with the measurement periodicity;
wherein the information includes information about a base periodicity of NCSG and a predefined measurement cycle for measurement of a de-activated serving cell, and the measurement periodicity is determined based on the base periodicity of NCSG and the predefined measurement cycle; and
wherein when the predefined measurement cycle is an integral multiple of the base periodicity, the measurement periodicity is based on a minimum value among the predefined measurement cycle for the at least one deactivated cell.

6. The apparatus of claim 5, wherein when the predefined measurement cycles defined for a number of deactivated serving cells are the same, the measurement periodicity is the predefined measurement cycle per se.

7. The apparatus of claim 5, wherein when the predefined measurement cycles defined for a number of deactivated serving cells are different, the measurement periodicity is a minimal value among the predefined measurement cycles.

8. The apparatus of claim 5, wherein when the NCSG is utilized for measurement of the deactivated serving cell and other type measurements, the measurement periodicity is further multiplied by a weight factor which relates to the other type measurements.

9. The apparatus of claim 8, wherein the weight factor is a value equal to a sum of a number of deactivated serving cells to be measured and a number of frequency segments on which other type measurements are to be performed.

10. The apparatus of claim 5, wherein the deactivated serving cell includes at least one of a secondary cell, a primary cell and a primary SCG cell.

11. A wireless device, comprising:
at least one antenna;
at least one radio coupled to the at least one antenna; and
a processor coupled to the at least one radio;
wherein the wireless device is configured to:
acquire a measurement gap (MG) configuration scheduling a measurement operation for at least one deactivated serving cell based on a network-controlled small gap (NCSG), and
perform the measurement operation based on the NCSG in accordance with the MG configuration;
wherein the MG configuration includes information on a measurement periodicity of NCSG-based measurement for a deactivated serving cell, and wherein the wireless device is configured to perform the measurement operation for the deactivated serving cell in accordance with the measurement periodicity;
wherein the information includes information about a base periodicity of NCSG and a predefined measurement cycle for measurement of a de-activated serving cell, and the measurement periodicity is determined based on the base periodicity of NCSG and the predefined measurement cycle; and
wherein when the predefined measurement cycle is not an integral multiple of the base periodicity, the measurement periodicity is based on a largest multiple of the base periodicity smaller than a minimum value among the predefined measurement cycle for the at least one deactivated cell.

12. The wireless device of claim 10, wherein the measurement periodicity is a value selected from a set of measurement cycles including the predefined measurement cycle and which is a largest value in the set of measurement cycles smaller than the minimum value.

* * * * *